(12) United States Patent
Cook et al.

(10) Patent No.: US 12,727,538 B2
(45) Date of Patent: Sep. 8, 2026

(54) MULTI-SEGMENT HEADER FOR AN AGRICULTURAL HARVESTER

(71) Applicant: CNH Industrial America LLC, New Holland, PA (US)

(72) Inventors: Joel T. Cook, Akron, PA (US); Cory M. Conway, Maquoketa, IA (US); James Kopp, Mount Joy, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 283 days.

(21) Appl. No.: 18/563,680

(22) PCT Filed: May 24, 2022

(86) PCT No.: PCT/US2022/030686
§ 371 (c)(1),
(2) Date: Nov. 22, 2023

(87) PCT Pub. No.: WO2022/251185
PCT Pub. Date: Dec. 1, 2022

(65) Prior Publication Data

US 2024/0245002 A1 Jul. 25, 2024

Related U.S. Application Data

(60) Provisional application No. 63/192,238, filed on May 24, 2021.

(51) Int. Cl.
*A01D 41/14* (2006.01)
*A01D 61/00* (2006.01)

(52) U.S. Cl.
CPC ......... *A01D 41/144* (2013.01); *A01D 61/004* (2013.01)

(58) Field of Classification Search
CPC ..... A01D 41/144; A01D 61/004; A01D 41/14
See application file for complete search history.

(56) References Cited

U.S. PATENT DOCUMENTS 6,640,527 B2 * 11/2003 Farley .................. A01D 61/008 56/364
7,621,113 B2 * 11/2009 Blakeslee ............ A01D 61/004 56/153

(Continued)

FOREIGN PATENT DOCUMENTS

| | | | |
|---|---|---|---|
| DE | 102005020462 | A1 | 11/2006 |
| EP | 3270681 | B1 | 12/2018 |
| WO | 2012/030763 | A1 | 3/2012 |

OTHER PUBLICATIONS

International Search Report and Written Opinion for PCT Application No. PCT/US2022/030686 dated Oct. 31, 2022 (17 pages).

*Primary Examiner* — Adam J Behrens
*Assistant Examiner* — Jose Antonio Martinez
(74) *Attorney, Agent, or Firm* — Fletcher Yoder, P.C.

(57) ABSTRACT

A multi-segment header (102) for an agricultural harvester comprising a multi-segment chassis (150) having a longitudinal support beam (152), an auger (156) extending widthwise across the multi-segment chassis (150) and adjacent the longitudinal support beam (152), and a backsheet extension (160) mounted to a posterior end of the longitudinal support beam (152) of the multi-segment chassis (150). The auger (156) and the backsheet extension blocks grain from passing over the backsheets (158) and going unharvested.

17 Claims, 8 Drawing Sheets

(56) References Cited

U.S. PATENT DOCUMENTS

| | | | | |
|---|---|---|---|---|
| 7,857,120 | B1 * | 12/2010 | Perring | B65G 33/24 198/671 |
| 7,992,372 | B1 | 8/2011 | Coers et al. | |
| 9,198,355 | B2 | 12/2015 | Heim et al. | |
| 2002/0189224 | A1 * | 12/2002 | Lauer | A01D 61/008 56/16.6 |
| 2007/0193243 | A1 * | 8/2007 | Schmidt | A01D 43/06 56/181 |
| 2008/0184689 | A1 * | 8/2008 | Lohrentz | A01D 41/142 56/11.9 |
| 2009/0320431 | A1 * | 12/2009 | Puryk | A01D 41/14 56/181 |
| 2018/0368320 | A1 * | 12/2018 | Schulze Selting | A01D 34/8355 |
| 2019/0045709 | A1 | 2/2019 | Schroeder et al. | |
| 2021/0112716 | A1 | 4/2021 | Farley et al. | |

* cited by examiner

MULTI-SEGMENT HEADER FOR AN AGRICULTURAL HARVESTER

The exemplary embodiments of present invention relate generally to a header of a plant cutting machine (e.g., a combine harvester) and, more specifically, to a multi-segment header equipped with a backsheet extension and a multi-segment auger.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongated sickle mechanism that reciprocates sidewardly relative to a non-reciprocating guard structure. After crops are cut, they are collected inside the header and transported via a conveyor such as a draper belt towards a feederhouse located centrally of the header.

SUMMARY OF THE INVENTION

In accordance with an exemplary embodiment there is provided a multi-segment header for an agricultural harvester comprising a multi-segment chassis having a longitudinal support beam, an auger extending widthwise across the multi-segment chassis and adjacent the longitudinal support beam, and a backsheet extension mounted to a posterior end of the longitudinal support beam of the multi-segment chassis.

In accordance with an exemplary embodiment there is provided a multi-segment header for an agricultural harvester comprising a multi-segment chassis and a multi-segment auger supported by the multi-segment chassis. The multi-segment auger includes a center auger segment having first flights defining a first overall diameter, and a lateral auger segment having second flights defining a second overall diameter greater than the first overall diameter. The multi-segment header additionally comprises an infeed auger supported by the chassis beneath the center auger segment of the multi-segment auger.

So constructed and arranged, the backsheet extension and the multi-segment auger effectively prevents seed and crop material from falling over the backsheet and out of the header, whereby such material is effectively harvested by the header. Additionally, the multi-segment header provides for a header that can lower its auger center line while simultaneously maintaining flighting across the center of the header, which provides better crop engagement and better visibility for the operator.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
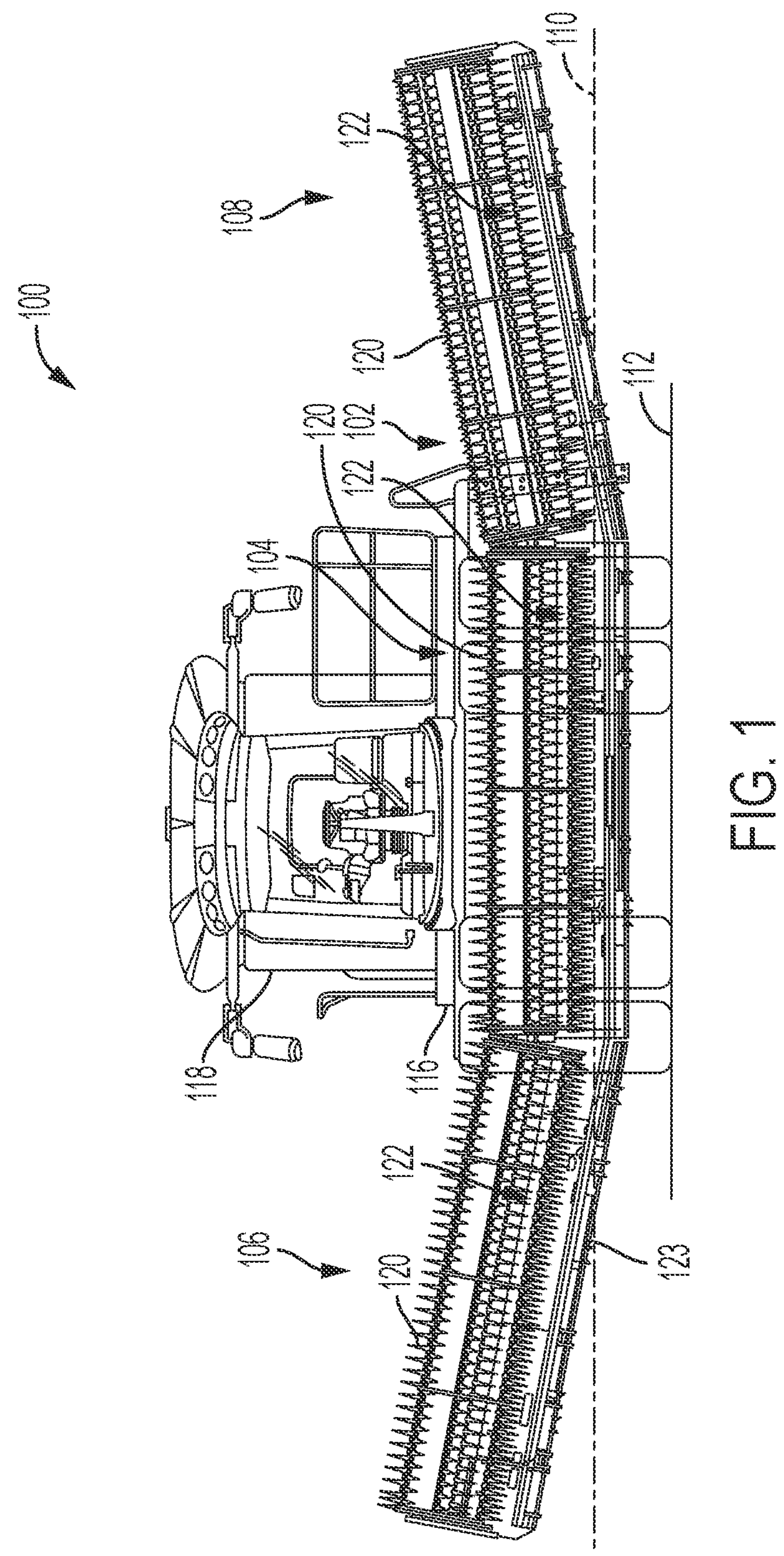
FIG. 1 is a front elevation view of an agricultural harvester including a header having a multi-segment chassis.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean by way of example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring to the drawings, FIG. 1 shows a front view of an exemplary embodiment of a harvester 100. The harvester 100 includes a header 102. The header 102 can be, e.g., in the form of a multi-segment header including a pivoting structure having a central segment or section 104 (e.g., center frame) with right and left segments or wings 106, 108 (e.g., pivot wings) capable of pivoting relative to the central section 104 to accommodate uneven terrain while providing a wide header for greater crop capacity. Together, the right segment, central segment, and left segment form a multi-segment chassis 150, described in greater detail below in connection with FIGS. 2 through 4. A horizontal plane 110 illustrates a horizontal orientation of the header 102 which is substantially parallel to the ground 112. In some exemplary embodiments, discussed below, the header 102 can include one or more augers to assist in guiding crop from the header 102 into a processing system 116 within the harvester 100 (e.g., below the cab 118). In other exemplary embodiments, a draper belt system 122 can be used to guide crop from the header 102 into the processing system 116. In other exemplary embodiments, the header may employ both augers and draper conveyors to guide crop from the header into the processing system 116. The central section 104 and the right and left wings 106, 108 can include reels 120. The harvester 100 can further include a cutter bar 123 configured to cut crop and flex as the right and left wings 106, 108 pivot relative to the central section 104. In some exemplary embodiments, the right and left segments of the header may be lockable to extend collinearly with the central segment. Alternatively, the central, left and right segments may be rigidly connected whereby the right and left segments do not pivot with respect to the central segment.

Figure 2:
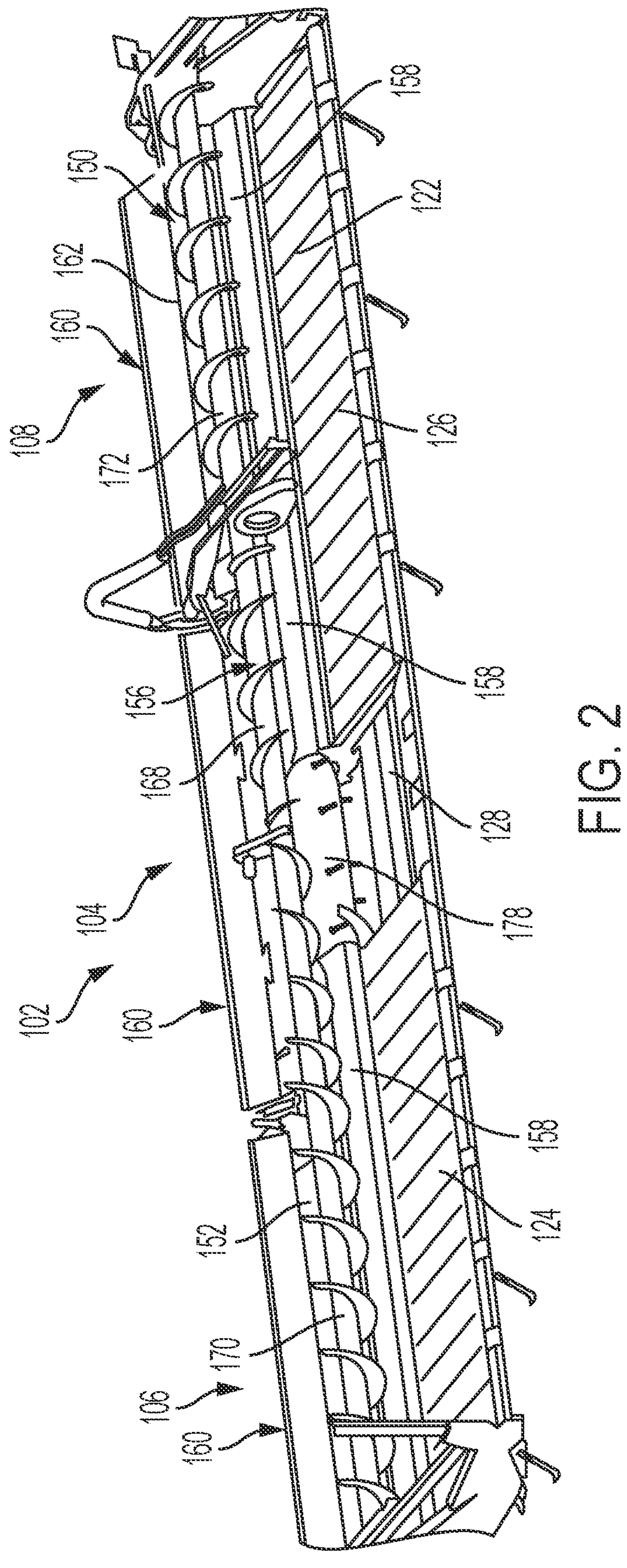
FIG. 2 is a perspective view of the multi-segment chassis header of FIG. 1 with certain elements omitted for purposes of illustration.

FIG. 2 is perspective view of a partial assembly of the multi-segment header 102. The multi-segment header 102 includes a draper belt system 122 for transferring harvested crop from the right and left wings 106, 108 to the central segment 104 such that the central segment 104 can introduce the crop into the processing system. The draper belt system 122 includes a first lateral draper belt 124 at the right wing 106, a second lateral draper belt 126 at the left wing 108, and a third draper belt 128 at the central segment 104 disposed between and traveling transverse to the first and second lateral draper belts. The third draper belt 128 receives crop material from the first and second lateral draper belts and moves the crop material rearwardly toward the processing system.

The multi-segment chassis 150 includes a longitudinal support beam 152 having a rear surface 154 (FIGS. 4 and 5) that is sloped relative to a horizontal plane of the multi-segment header. For example, the longitudinal support beam 152 can be formed as a rectangular piped shaped support beam that slopes downwardly and forwardly whereby its rear surface 154 is disposed at less than 90° relative to a horizontal plane of the multi-segment header, as best shown in FIG. 5. An auger 156 (also known as a compression auger) extends widthwise across the multi-segment chassis and adjacent the longitudinal support beam.

A backsheet 158 is supported by each segment of the multi-segment chassis 150. A backsheet is a panel that keeps grain and seed redirected onto the draper belt system 122 whereby the draper belt system can convey the grain and seed into the processing system.

Figure 3:
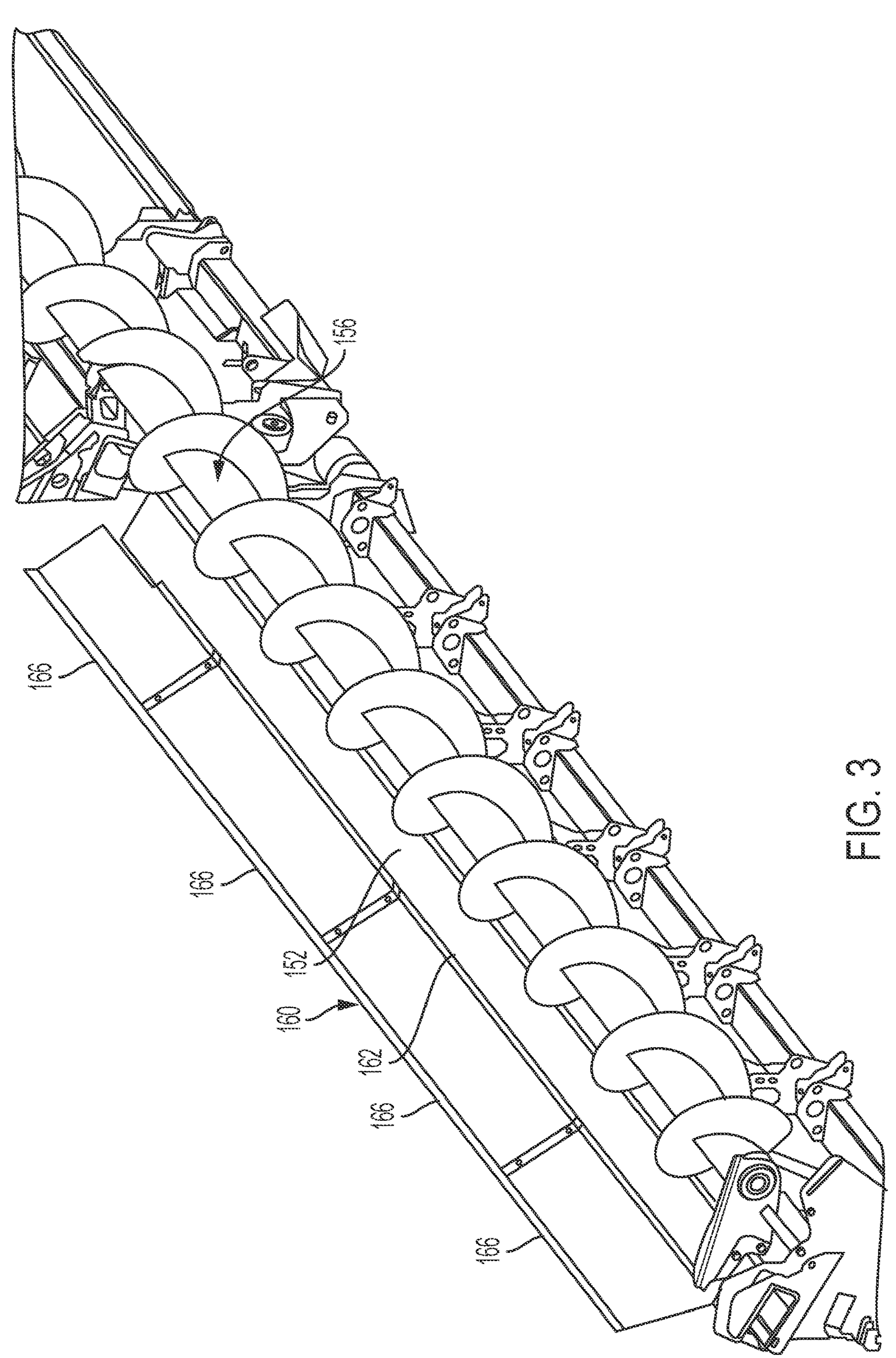
FIG. 3 is a perspective view of a portion of an agricultural harvester header including a backsheet extension in accordance with an exemplary embodiment of the subject disclosure.
Figure 4:
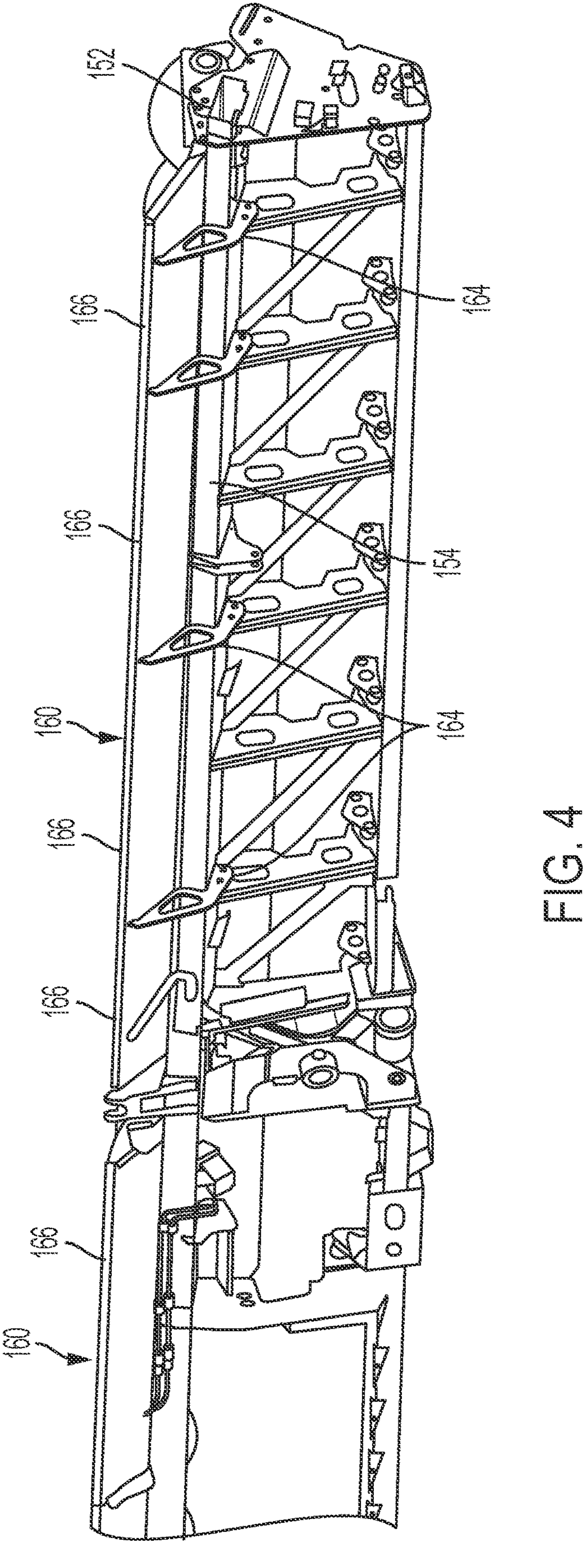
FIG. 4 is a rear perspective view of the agricultural harvester header of FIG. 3.
Figure 5:
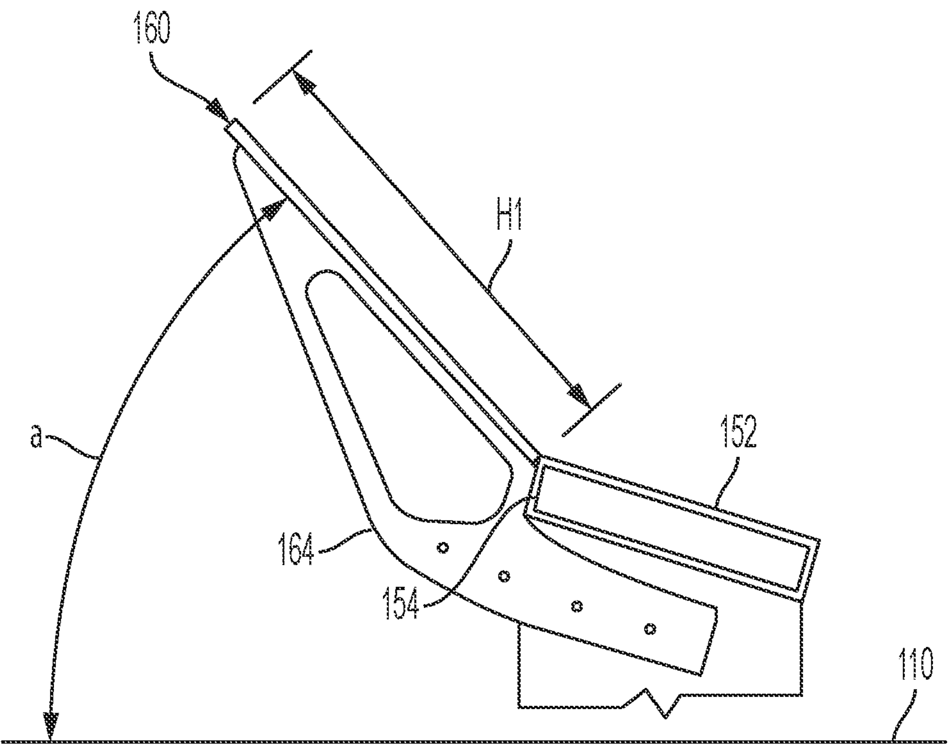
FIG. 5 is an end view of a backsheet extension illustrating its attachment to a longitudinal support beam of a chassis of the agricultural harvester header of FIG. 3.

Referring to FIGS. 3 through 5, the multi-segment header further comprises a backsheet extension 160 mounted to a posterior end 162 of the longitudinal support beam 152 of the multi-segment chassis 150. As best shown in FIGS. 4 and 5, the backsheet extension is directly mounted to the rear surface 154 of the longitudinal support beam of the multi-segment chassis. In this regard, the multi-segment header further comprises a mounting bracket 164 positioned rearwardly of the rear surface of the longitudinal support beam for mounting each backsheet extension to the longitudinal support beam of the multi-segment chassis.

The backsheet extension 160 is plate-shaped and can include a plurality of backsheet extension segments 166 collectively extending substantially in end to end relation with the multi-segment chassis. According to an aspect, the plurality of backsheet extension segments extend substantially in end to end relation with each segment of the multi-segment chassis. As shown in FIG. 5, the backsheet extension 160 extends from the longitudinal support beam 152 at an angle relative to a horizontal plane of the multi-segment header. In other words, the backsheet extension is disposed such that its major plane slopes rearwardly and upwardly relative to the chassis, e.g., a horizontal plane of the chassis, at an angle "$\alpha$" of about 30° to 60° relative to the horizontal 110, including 25°, 35°, 40°, 45°, 50°, 55° and 65°. In this way, grain and seed striking the backsheet extension is captured and directed downwardly into the header onto the draper belt system 122 whereby it is conveyed to the processing system. In an aspect, the backsheet extension can have an overall width "H1" of about 5 to 15 inches, and preferably about 8 to 10 inches, including 6, 7, 9, 12, 13, 14 and 16 inches.

Figure 7:
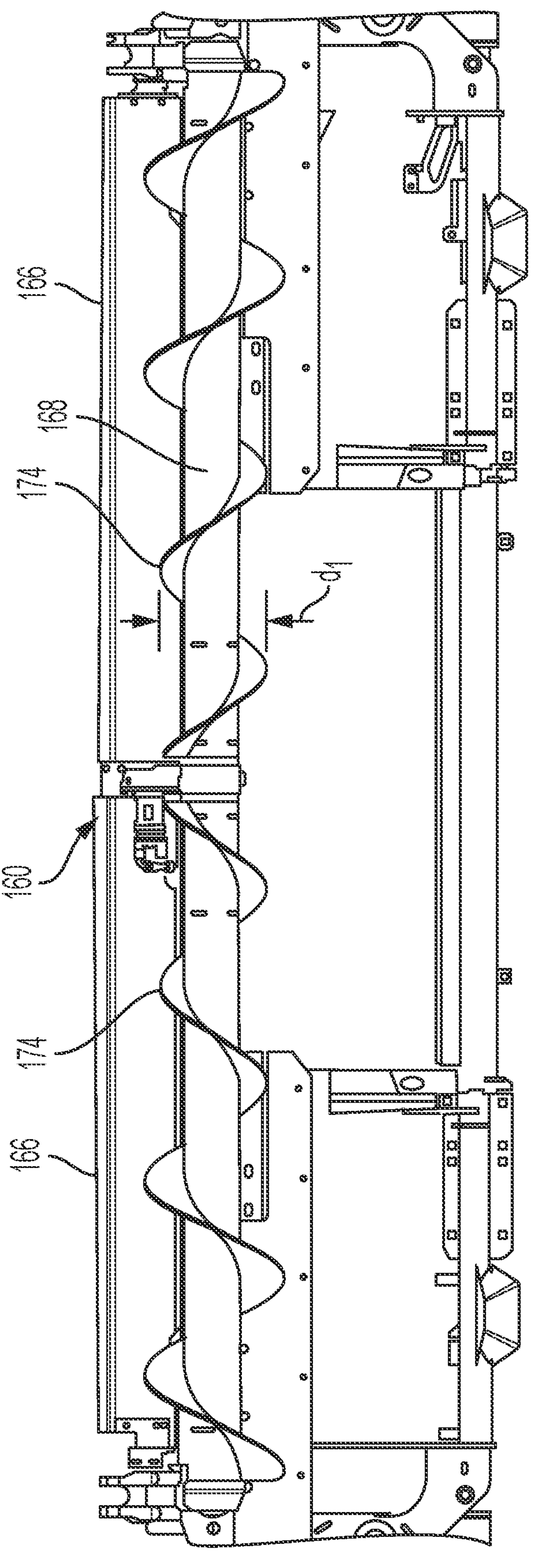
FIG. 7 is a view similar to FIG. 6 with certain elements omitted for purposes of illustration.

Referring again to FIG. 2, the auger 156 is constructed as a multi-segment auger supported by the multi-segment chassis. The multi-segment auger comprises a center auger segment 168 substantially spanning the central segment 104 of the header. Additionally, the multi-segment auger comprises a lateral auger segment for each lateral segment of the multi-segment header. In the exemplary embodiment, the multi-segment auger includes a lateral auger segment 170 substantially spanning the right segment 106 of the header and another auger segment 172 substantially spanning the right segment 108 of the header. As best shown in FIG. 7, the center auger segment 168 has first helical flights 174 defining a first overall diameter "d1" of about 10 to 14 inches, including 9, 11, 12 and 13 inches.

Figure 8:
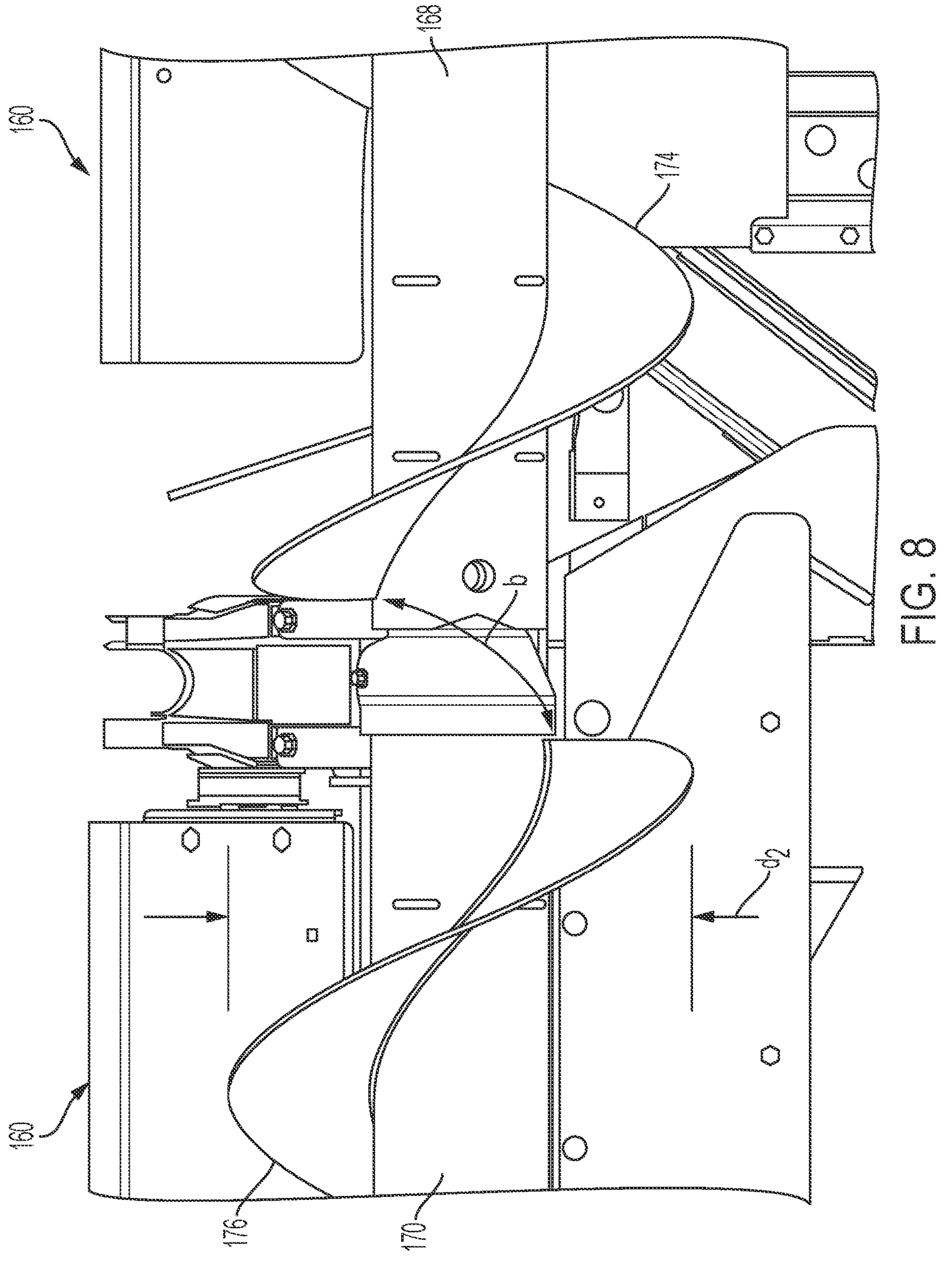
FIG. 8 is an enlarged front view of a juncture of a center auger segment and a lateral auger segment of the agricultural harvester header of FIG. 2.

According to an aspect, the first helical flights 174 can gradually decrease in diameter from the lateral ends to the center of the center auger segment. As best shown in FIG. 8, the lateral auger segment 170 has second helical flights 176 defining a second overall diameter "d2" greater than the first overall diameter "d1". According to an aspect, the second overall diameter is about 14 to 18 inches, including 15, 16, 17 and 19 inches. Referring to FIG. 8, the first flights 174 of the center auger segment 168 can be offset at an angle "b" relative to the second flights 176 of the lateral auger segment 170. The amount of circumferential offset can be e.g., 160°, 170°, 180°, 190°, 200°, or more or less than such.

Figure 6:
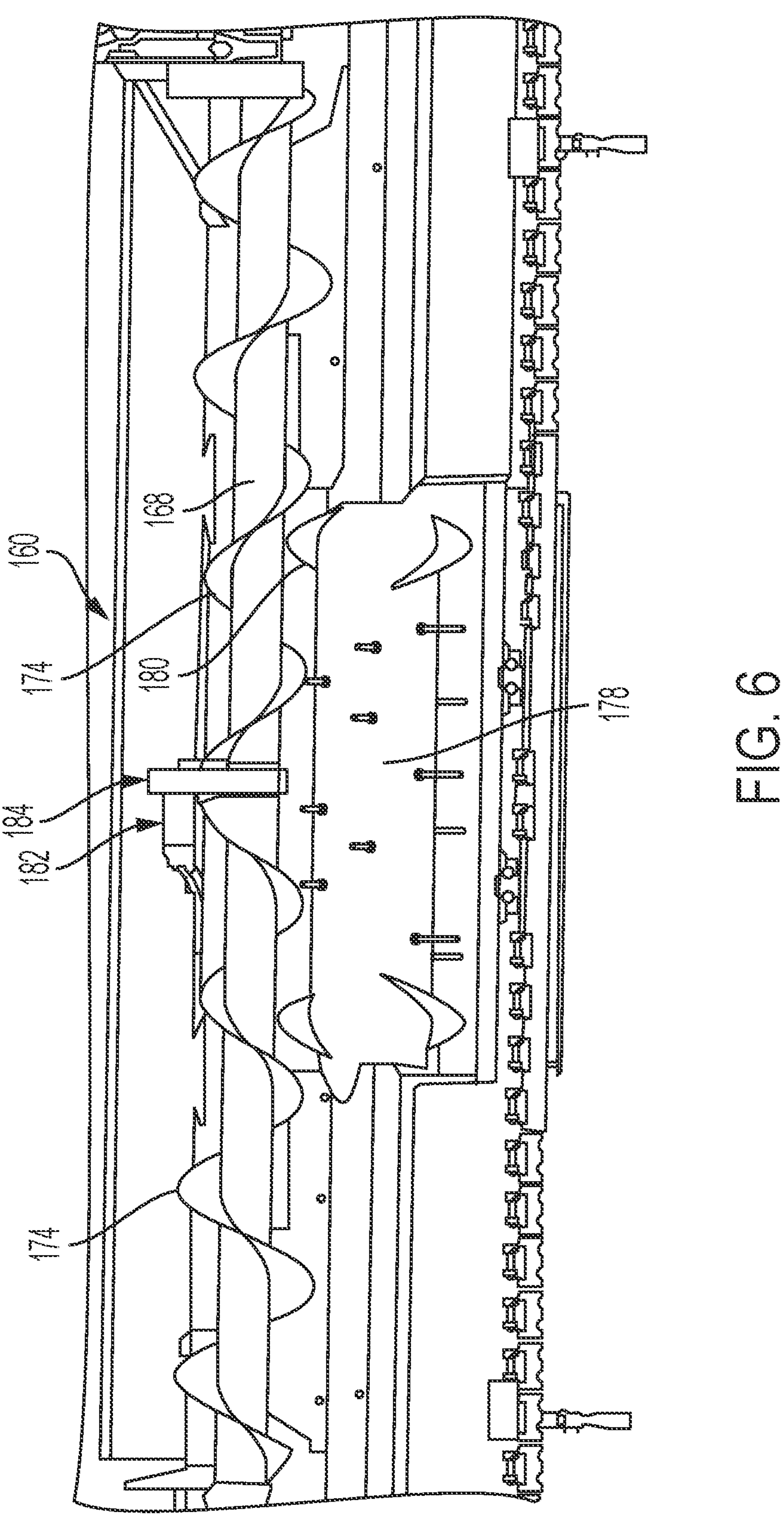
FIG. 6 is a front view of a center portion of the agricultural harvester header of FIG. 2.

As shown in FIGS. 2 and 6, the multi-segment header further comprises an infeed auger 178 rotatably and vertically movably supported by the multi-segment chassis beneath the center auger segment 168 of the multi-segment auger 156 for delivering crop material from the third draper belt 128 to the processing system. The infeed auger can be raised or lowered by conventional hydraulic cylinders situated at opposite ends thereof. According to an aspect, because of the vertical movability of the infeed auger 178, a centerline of the multi-segment auger 156 is spaced from a centerline of the infeed auger 178 about 18 to 22 inches, including 17, 19, 20, 21 and 23 inches, and the distance from the first flights 174 of the center auger segment to flights 180 of the infeed auger is about 2 to 4 inches. The smaller diameter first flights 174 of the center auger segment 168 of the multi-segment auger 156 allows the multi-segment auger to be positioned close to the infeed auger 178. Placement of the multi-segment auger in relatively close proximity to the infeed auger in combination with backsheet extensions placed at the posterior end of the longitudinal support beam 152 provide improved sight lines for an operator located in the cab of the agricultural harvester. That is, placing the multi-segment auger at a lower height and securing the backsheet extensions to the posterior end of the longitudinal support beam creates an overall lower profile for the header, thereby enabling the operator to see the fore regions of the header more easily.

Additionally, as shown in FIG. 6, the multi-segment header further comprises a drive 182 substantially centrally located with respect to the center auger segment 168 for rotatably driving the multi-segment auger 156. The drive can comprise a hydraulic, pneumatic, or electric motor driving a belt or chain 184 operatively connected to the center auger segment. The center auger segment includes a gap spacing between opposed flights 174 whereby a driven shaft portion of the auger carries an unillustrated pulley or sprocket that is rotatably driven by the belt or chain.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A multi-segment header of an agricultural harvester comprising:

- a multi-segment chassis having a longitudinal support beam with an exposed top surface, wherein the exposed top surface of the longitudinal support beam slopes downwardly and forwardly;
- an auger extending widthwise across the multi-segment chassis and adjacent the longitudinal support beam; and
- a backsheet extension directly mounted to a rear surface of the longitudinal support beam of the multi-segment chassis, wherein the backsheet extension has an exposed top surface that slopes downwardly and forwardly.

2. The multi-segment header of claim 1, further comprising a mounting bracket that mounts the backsheet extension to the longitudinal support beam of the multi-segment chassis.

3. The multi-segment header of claim 2, wherein the mounting bracket is positioned rearwardly of the rear surface of the longitudinal support beam.

4. The multi-segment header of claim 1, wherein the backsheet extension is plate-shaped.

5. The multi-segment header of claim 1, wherein the backsheet extension includes a plurality of backsheet extension segments collectively extending substantially in end to end relation with the multi-segment chassis.

6. The multi-segment header of claim 1, wherein the backsheet extension includes a plurality of backsheet extension segments extending substantially in end to end relation with each segment of the multi-segment chassis.

7. The multi-segment header of claim 1, wherein the backsheet extension has an overall width of about 5 to 15 inches.

8. The multi-segment header of claim 1, wherein the rear surface of the longitudinal support beam is sloped relative to a horizontal plane of the multi-segment header.

9. An agricultural harvester comprising the multi-segment header of claim 1.

10. A multi-segment header of an agricultural harvester comprising:

- a multi-segment chassis having a longitudinal support beam with an exposed top surface, wherein the exposed top surface of the longitudinal support beam slopes downwardly and forwardly;
- a multi-segment auger supported by the chassis, the multi-segment auger including:
  - a center auger segment having first flights defining a first overall diameter, and
  - a lateral auger segment having second flights defining a second overall diameter greater than the first overall diameter;
- an infeed auger supported by the multi-segment chassis beneath the center auger segment of the multi-segment auger; and
- a backsheet extension directly mounted to a rear surface of the longitudinal support beam of the multi-segment chassis, wherein the backsheet extension has an exposed top surface that slopes downwardly and forwardly.

11. The multi-segment header of claim 10, wherein the first overall diameter is about 10 to 14 inches.

12. The multi-segment header of claim 10, wherein the second overall diameter is about 14 to 18 inches.

13. The multi-segment header of claim 10, wherein the first flights of the center auger segment are offset about 180 degrees relative to the second flights of the lateral auger segment.

14. The multi-segment header of claim 10, further comprising a drive substantially centrally located with respect to the center auger segment for rotatably driving the multi-segment auger.

15. The multi-segment header of claim 10, wherein a centerline of the multi-segment auger is spaced from a centerline of the infeed auger about 18 to 22 inches.

16. The multi-segment header of claim 10, wherein the infeed auger is movable relative to the multi-segment auger.

17. An agricultural harvester comprising the multi-segment header of claim 10.

* * * * *